US012555364B2

(12) United States Patent
Sakai et al.

(10) Patent No.: US 12,555,364 B2
(45) Date of Patent: Feb. 17, 2026

(54) INFORMATION PROCESSING APPARATUS, INFORMATION PROCESSING METHOD, AND STORAGE MEDIUM

(71) Applicant: NEC Corporation, Tokyo (JP)

(72) Inventors: Ryosuke Sakai, Tokyo (JP); Soma Shiraishi, Tokyo (JP); Tomokazu Kaneko, Tokyo (JP)

(73) Assignee: NEC CORPORATION, Tokyo (JP)

( * ) Notice: Subject to any disclaimer, the term of this patent is extended or adjusted under 35 U.S.C. 154(b) by 333 days.

(21) Appl. No.: 18/205,238

(22) Filed: Jun. 2, 2023

(65) Prior Publication Data

US 2023/0401832 A1 Dec. 14, 2023

(30) Foreign Application Priority Data

Jun. 8, 2022 (JP) ................................. 2022-093145

(51) Int. Cl.
*G06V 10/776* (2022.01)
*G06V 10/82* (2022.01)

(52) U.S. Cl.
CPC ............ *G06V 10/776* (2022.01); *G06V 10/82* (2022.01)

(58) Field of Classification Search
None
See application file for complete search history.

(56) References Cited

U.S. PATENT DOCUMENTS

| 11,734,937 B1* | 8/2023 | Pushkin | G06F 18/2155 |
| | | | 706/12 |
| 2022/0004823 A1* | 1/2022 | Shoshan | G06V 10/778 |
| 2023/0210579 A1* | 7/2023 | Torabi | G06Q 10/0635 |

FOREIGN PATENT DOCUMENTS

| JP | H08-106295 A | 4/1996 |
| JP | H11-272801 A | 10/1999 |
| JP | 2015-095212 A | 5/2015 |
| JP | 2020-046883 A | 3/2020 |

* cited by examiner

*Primary Examiner* — Fan Zhang
(74) *Attorney, Agent, or Firm* — Sughrue Mion, PLLC

(57) ABSTRACT

Provided is an information processing apparatus causing an image identification model to perform learning in consideration between a degree of similarity between an original image and a converted image. The information processing apparatus includes at least one processor configured to execute: a training data generating process of generating converted images from original images using image conversion parameters and giving, to the generated converted images, pseudo classes corresponding to classes of the original images and the image conversion parameters, respectively; a loss-for-training determining process of generating an objective function in which correction terms each given in consideration of a degree of similarity between a corresponding one of the classes and a corresponding one of the pseudo classes is reflected, the correction terms being determined for the respective image conversion parameters; and a learning process of causing an image identification model to perform learning using the converted images and the objective function.

9 Claims, 10 Drawing Sheets

INFORMATION PROCESSING APPARATUS, INFORMATION PROCESSING METHOD, AND STORAGE MEDIUM

This Nonprovisional application claims priority under U.S.C. § 119 on Patent Application No. 2022-093145 filed in Japan on Jun. 8, 2022, the entire contents of which are hereby incorporated by reference.

TECHNICAL FIELD

The present invention relates to an information processing apparatus, an information processing method, and a storage medium.

BACKGROUND ART

There has been known a technique of applying an image identifying process to a target image. Further, there has been known a training data generating apparatus capable of mechanically generating training data with which machine learning for identifying an image is carried out on a model. For example, Patent Literature 1 discloses a pattern identifier which is based on supervised learning, the identifier including: a data expansion section that generates pseudo unknown data by carrying out, on unknown data such as image data, expansion by the same method as that carried out on training data when an identification model is created; and an identifying section that applies the pseudo unknown data to the identification model and carries out classification of class on the basis of an expected value of the result. Patent Literature 1 states as follows. That is, with this technique of Patent Literature 1, when unknown data is identified after expanding training data and carrying out learning, a rule (decision rule) regarding to which class the unknown data is allocated is improved, and accordingly the identification performance can be enhanced.

CITATION LIST

Patent Literature

[Patent Literature 1]
Japanese Patent Application Publication, Tokukai, No. 2015-095212

SUMMARY OF INVENTION

Technical Problem

However, in a case of an image-for-learning for a product identification model, it is difficult to generate a new image suitable for learning. For example, an image-for-learning for product identification can be generated by carrying out a process such as color conversion, character conversion, or lateral (horizontal) inversion on an existing product image; however, it is revealed that a model caused to carry out learning with use of such an image sometimes cannot identify an image even if the identification of the image seems easy to a user. The inventors conducted study, and arrived at the possibility that the above phenomenon might be caused for the following reason. That is, data which cannot be regarded as a product of the same class is generated from an image having been subjected to an image conversion process, and the learning is carried out with use of such data.

The inventors also arrived at the possibility that the above phenomenon might be caused for the following reason. That is, learning is carried out such that, in a case where a new pseudo product class is given to the image having been subjected to the image conversion process, a degree of similarity between the converted image and the original image is not considered and the converted image obtained by the image conversion is identified as a product of different kind; thus, excessive optimization to the training data, i.e., overlearning may have caused the above phenomenon.

An example aspect of the present invention was made in view of the above problem, and has an example object to provide a technique that causes an image identification model to carry out learning in consideration of a degree of similarity between an original image and a converted image.

Solution to Problem

An information processing apparatus in accordance with an example aspect of the present invention includes at least one processor configured to execute: a training data generating process of generating converted images from original images with use of image conversion parameters and giving, to the converted images thus generated, pseudo classes corresponding to classes of the original images and the image conversion parameters, respectively; a loss-for-training determining process of generating an objective function in which correction terms each given in consideration of a degree of similarity between a corresponding one of the classes and a corresponding one of the pseudo classes is reflected, the correction terms being determined for the respective image conversion parameters; and a learning process of causing an image identification model to carry out learning with use of the converted images and the objective function.

An information processing method in accordance with an example aspect of the present invention includes: at least one processor generating converted images from original images with use of image conversion parameters and giving, to the converted images thus generated, pseudo classes corresponding to classes of the original images and the image conversion parameters, respectively; the at least one processor generating an objective function in which correction terms each given in consideration of a degree of similarity between a corresponding one of the classes and a corresponding one of the pseudo classes is reflected, the correction terms being determined for the respective image conversion parameters; and the at least one processor causing an image identification model to carry out learning with use of the converted images and the objective function.

A storage medium in accordance with an example aspect of the present invention is a non-transitory, computer-readable storage medium in which an information processing program is stored, the information processing program causing a computer to execute: a process of generating converted images from original images with use of image conversion parameters and giving, to the converted images thus generated, pseudo classes corresponding to classes of the original images and the image conversion parameters, respectively; a process of generating an objective function in which correction terms each given in consideration of a degree of similarity between a corresponding one of the classes and a corresponding one of the pseudo classes is reflected, the correction terms being determined for the respective image conversion parameters; and a process of causing an image identification model to carry out learning with use of the converted images and the objective function Advantageous Effects of Invention In accordance with an example aspect of the present invention, it is possible to cause an image identification model to carry out learning in consideration of a degree of similarity between an original image and a converted image.

DESCRIPTION OF EMBODIMENTS

First Example Embodiment

The following description will discuss a first example embodiment of the present invention in detail with reference to the drawings. The present example embodiment is a basic form of example embodiments described later.

(Configuration of Information Processing Apparatus 1)

Figure 1:
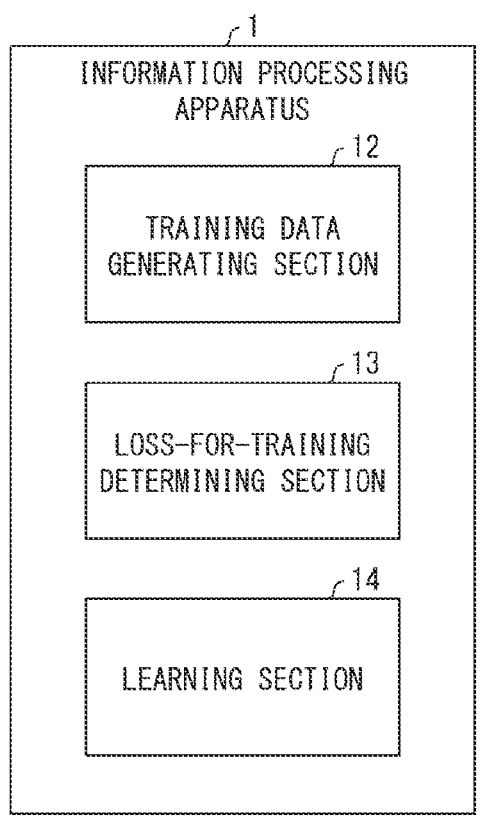
FIG. 1 is a block diagram illustrating a configuration of an information processing apparatus 1 in accordance with a first example embodiment of the present invention.

The following will describe, with reference to FIG. 1, a configuration of an information processing apparatus 1 in accordance with the present example embodiment. FIG. 1 is a block diagram illustrating a configuration of the information processing apparatus 1.

As shown in FIG. 1, the information processing apparatus 1 includes a training data generating section 12, a loss-for-training determining section 13, and a learning section 14. The training data generating section 12, the loss-for-training determining section 13, and the learning section 14 are respectively a training data generating means, a training-loss determining means, and a learning means recited in the claims.

The training data generating section 12 generates converted images from original images with use of image conversion parameters. In the present example embodiment, the original image refers to an already existing image. One example of the original image is an image of a product. The original image has an original class given thereto. Original images of different products have different original classes allocated thereto in advance. The image conversion parameter is a parameter indicating an image conversion method. Different parameters are set to different methods. The parameter is simply for discrimination of the methods from each other. There is no limitation on the type of the parameter. Examples of the image conversion method include color conversion, character conversion, and lateral inversion. However, this is not limitative. The color conversion is hue conversion (rotation) that changes the hue of an image. The character conversion is conversion of a character string in an image into another character string. The lateral inversion is conversion of an image into an image which is laterally symmetric with respect to the original image. The image conversion method may include an option of "no conversion".

The training data generating section 12 selects any one of the parameters indicating color conversion, character conversion, lateral inversion, and the like, and uses the method corresponding to the selected parameter to generate a converted image. The method for selecting the parameter may be any method. Further, the training data generating section 12 may give, to the converted image thus generated, a pseudo class corresponding to the original class and the conversion parameter. The pseudo class is a newly given class, which is different from the original class. However, the original image and the converted image have similar portions; therefore, the class given to the converted image will be referred to as a "pseudo class" in the present example embodiment. If the conversion method in which no conversion takes place is selected, no converted image will be generated. Alternatively, if the conversion method in which no conversion takes place is selected, the training data generating section 12 may generate, as a converted image, an image which has not been subjected to conversion and may give, to the image thus generated, the same class as that of the original image.

The loss-for-training determining section 13 generates an objective function in which correction terms each given in consideration of a degree of similarity between a corresponding one of the classes and a corresponding one of the pseudo classes is reflected. More specifically, the loss-for-training determining section 13 generates the objective function derived so that the objective function includes correction terms set by a user or the information processing apparatus 1. Further, the loss-for-training determining section 13 may carry out calculation for the objective function.

The objective function is a value for evaluating an identification result given by an image identification model that identifies images of all classes including the original classes and the pseudo classes. There is no limitation on the type of the objective function. For example, the objective function may be a loss function indicating a magnitude of an error between an ideal output and an actual output with respect to input data.

The correction terms each given in consideration of the degree of similarity between the original image and the converted image refers to a correction term that is to be added to the objective function according to the degree of similarity between the appearances of the two images, or, conversely, the degree of difference between the appearances of the two images. The correction term can be set as appropriate according to the method for evaluating the similarity of the images. In the following description, the degree of similarity may also be referred to as a "similarity". In an example, a similarity of images may be evaluated as a distance in a multidimensional feature vector space which distance is output, upon input of an image, from a convolutional neural network which is under training. In this case, as the two images has a higher similarity, a distance between the two images is evaluated as shorter. Conversely, as the two images has a lower similarity, a distance between the two images is evaluated as longer. For example, the objective function may be set so as to decrease a distance between feature vectors of images of the same class and to increase a distance between feature vectors of images of different classes. Further, the correction term may be set such that a distance between feature vectors of an original class and a pseudo class having similar appearances is allowed to be shorter than a distance between feature vectors of another class and a pseudo class generated from the another class. By selecting an appropriate objective (loss) function, the network model is caused to carry out learning so that a distance between images of the same class is relatively short and a distance between images of different classes is relatively long. Therefore, in the present example embodiment, the correction term to be added to the loss function is set so as to allow conversion into a distance relation intended by the learning model.

In the present example embodiment, it is possible to change or designate a degree of similarity between an original image and a converted image. Further, it is possible to train, including the designated degree of similarity, the image identification model. That is, with the information processing apparatus 1 in accordance with the present example embodiment, when two images having a high similarity are used, it is possible to cause the image identification model to carry out learning such that an original class and a pseudo class generated from the original class are in a high similarity relation. Meanwhile, when two images having a low similarity are used, it is possible to cause the image identification model to carry out learning such that an original class and a pseudo class are in a low similarity relation. Consequently, resulting training data can be used in learning more effectively. Further, by selecting a conversion parameter in consideration of a feature of a product image, it is possible to reinforce the capacity of identifying an unknown product.

The learning section 14 causes the image identification model to carry out learning with use of the converted images generated by the training data generating section 12 and the objective function generated by the loss-for-training determining section 13. As discussed above, the objective function is given in consideration of the correction terms each indicating the degree of similarity. Further, the learning section 14 causes the image identification model to carry out learning so that the objective function given in consideration of the correction terms is put closer to a target position, such as a maximum value or a minimum value. For example, the image identification model is a neural network model involving use of, e.g., a convolutional neural network. The neural network model is caused to carry out learning by updating of a weight, a bias, and/or the like in the model so that a result of calculation of the objective function carried out with use of an output of the model is put closer to a preferred position. One example of the objective function used in the neural network model is a loss function aiming for minimization. Specific examples thereof include loss functions represented by a softmax cross entropy error and a sum of squared error. In accordance with the result of calculation of the objective function (loss function) derived by the loss-for-training determining section 13, the learning section 14 updates the weight, the bias, and/or the like in the image identification model.

In the information processing apparatus 1 shown in FIG. 1, the training data generating section 12, the loss-for-training determining section 13, and the learning section 14 are depicted to be arranged collectively in a single site. However, the information processing apparatus 1 is not limited to such arrangement. That is, the sections constituting the information processing apparatus 1 may be at least partially arranged dispersedly so as to be communicable to each other. Alternatively, the sections constituting the information processing apparatus 1 may be at least partially arranged in the cloud so as to be communicable to each other.

As discussed above, the information processing apparatus 1 in accordance with the present example embodiment is configured to include: the training data generating section 12 that generates converted images from original images with use of image conversion parameters and gives, to the converted images thus generated, pseudo classes corresponding to classes of the original images and the image conversion parameters, respectively; the loss-for-training determining section 13 that generates an objective function in which correction terms each given in consideration of a degree of similarity between a corresponding one of the classes and a corresponding one of the pseudo classes is reflected, the correction terms being determined for the respective image conversion parameters; and the learning section 14 that causes an image identification model to carry out learning with use of the converted images and the objective function. Thus, with the information processing apparatus 1 in accordance with the present example embodiment, it is possible to attain an effect of making it possible to cause the image identification model to carry out learning in consideration of a degree of similarity between an original image and a converted image. Further, by causing the image identification model to carry out learning while changing the magnitude of the correction term, it is possible to more effectively use training data.

(Flow of Information Processing Method)

Figure 2:
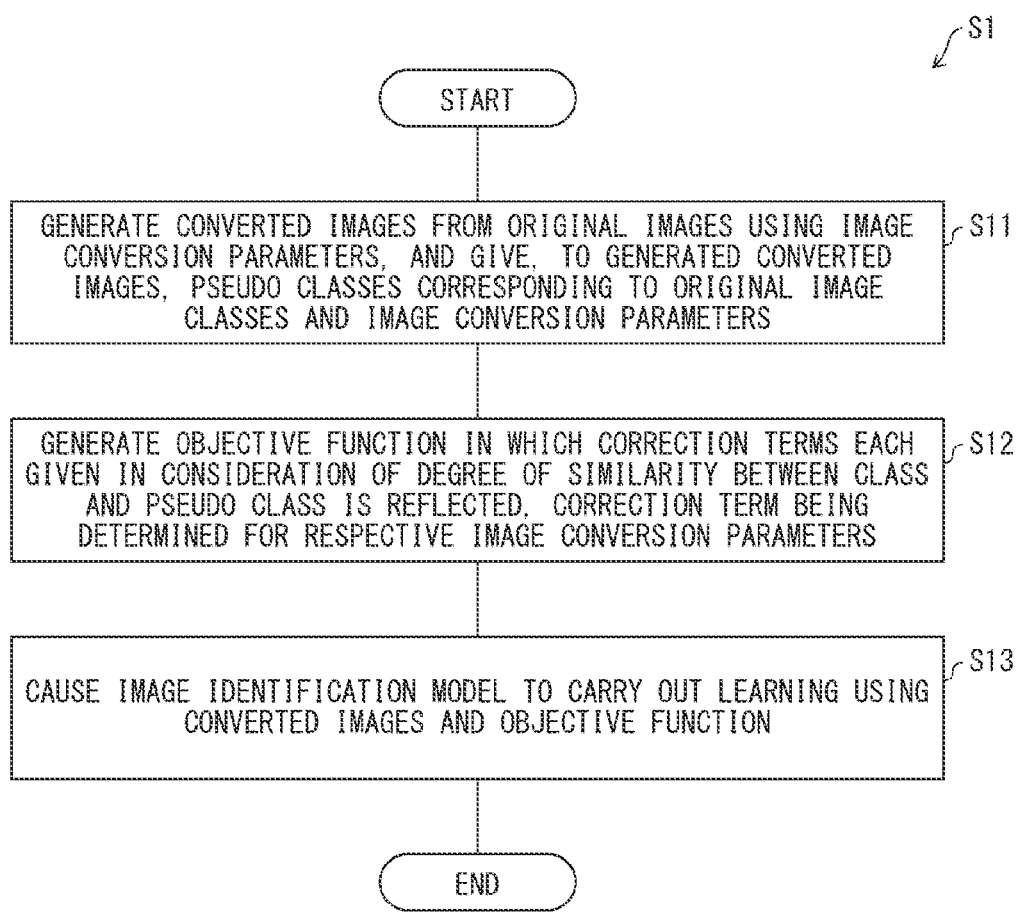
FIG. 2 is a flowchart illustrating a flow of an information processing method S1 in accordance with the first example embodiment.

The following will describe, with reference to FIG. 2, a flow of an information processing method S1 in accordance with the present example embodiment. FIG. 2 is a flowchart illustrating a flow of the information processing method S1.

As shown in FIG. 2, the information processing method S1 includes steps S11 to S13. In step S11, at least one processor (for example, the training data generating section 12) generates converted images from original images with use of the image conversion parameters, and gives, to the converted images thus generated, pseudo classes corresponding to classes of the original images and the image conversion parameters. The image conversion parameter is as discussed in the description of the configuration of the information processing apparatus 1.

In step S12, at least one processor (for example, the loss-for-training determining section 13) generates an objective function in which correction terms each given in consideration of a degree of similarity between a corresponding one of the classes and a corresponding one of the pseudo classes is reflected, the correction terms being determined for the respective image conversion parameters. The objective function and the correction terms each given in consideration of the degrees of similarity are as discussed in the description of the configuration of the information processing apparatus 1.

In step S13, at least one processor (for example, the learning section 14) causes the image identification model to carry out learning with use of the converted images and the objective function. The image identification model is as discussed in the description of the configuration of the information processing apparatus 1.

As discussed above, the information processing method S1 in accordance with the present example embodiment is configured to include: at least one processor generating converted images from original images with use of image conversion parameters and gives, to the converted images thus generated, pseudo classes corresponding to classes of the original images and the image conversion parameters, respectively; the at least one processor generating an objective function in which correction terms each given in a consideration of a degree of similarity between a corresponding one of the classes and a corresponding one of the pseudo classes is reflected, the correction terms being determined for the respective image conversion parameters; and the at least one processor causing an image identification model to carry out learning with use of the converted images and the objective function. Thus, with the information processing method S1 in accordance with the present example embodiment, it is possible to attain an effect of making it possible to cause the image identification model to carry out learning in consideration of a degree of similarity between an original image (original class) and a converted image (pseudo class). Further, by causing the image identification model to carry out learning while changing the correction term, it is possible to effectively use the training data.

Second Example Embodiment

Figure 3:
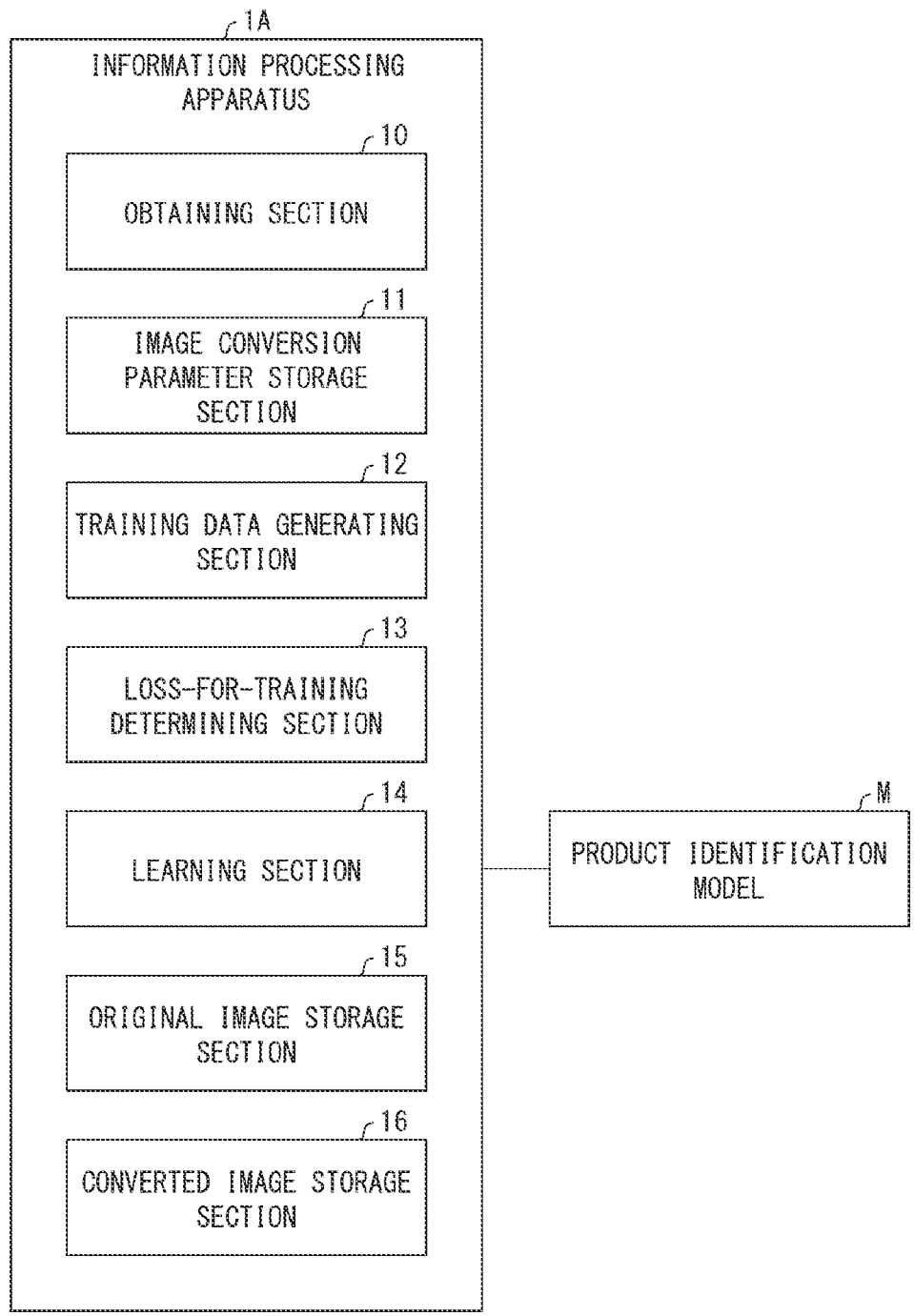
FIG. 3 is a block diagram illustrating a configuration of an information processing apparatus 1A in accordance with a second example embodiment of the present invention.

The following description will discuss a second example embodiment of the present invention in detail with reference to the drawings. Note that members having identical functions to those of the first example embodiment are given identical reference signs, and a description thereof will be omitted. FIG. 3 is a block diagram illustrating a configuration of an information processing apparatus 1A in accordance with the second example embodiment.

The information processing apparatus 1A in accordance with the second example embodiment includes an obtaining section 10, an image conversion parameter storage section 11, a training data generating section 12, a loss-for-training determining section 13, a learning section 14, an original image storage section 15, and a converted image storage section 16. The information processing apparatus 1A is connected with a product identification model M such that the information processing apparatus 1A is communicable with the product identification model M. The product identification model M is one example aspect of the image identification model. The functions of the training data generating section 12, the loss-for-training determining section 13, and the learning section 14 are identical to the functions of the corresponding sections described in the first example embodiment, and therefore descriptions thereof will be omitted. The following description will discuss the obtaining section 10, the image conversion parameter storage section 11, the original image storage section 15, and the converted image storage section 16.

The obtaining section 10 obtains an original image. A class of the original image will be referred to as an "original class". In the present example embodiment, the original image is an image of a single product, for example. Images of different products have respective different classes allocated thereto in advance. In an example, the obtaining section 10 obtains an image that a user has input to the information processing apparatus 1A. Alternatively, the obtaining section 10 may access a storage apparatus provided outside the information processing apparatus 1A and obtain an image stored therein.

The image conversion parameter storage section 11 has image conversion parameters stored therein, each of the image conversion parameters being for conversion of an original image into a converted image. The image conversion parameters are as discussed in the first example embodiment. Examples of the image conversion method include color conversion, character conversion, and lateral inversion. These conversion methods are used to simulate a difference between a new product package and an existing product package. Many of new product packages actually released on the market look similar to existing product packages. Thus, in order to identify such a new product, an image generated by subjecting an existing product image to conversion as indicated above is useful as training data.

In the present example embodiment, the training data generating section 12 selects any of the image conversion parameters stored in the image conversion parameter storage section 11, and uses the selected image conversion parameter to generate a converted image.

The original image storage section 15 stores therein the original image obtained by the obtaining section 10. The converted image storage section 16 stores therein the converted image generated by the training data generating section 12. The converted image and a label given thereto serve as training data used to cause the product identification model M to carry out learning.

The information processing apparatus 1A in accordance with the present example embodiment is an apparatus causing learning of the product identification model M that identifies whether a product in an image is identical to or different from any of the products of the classes already registered. For retail stores that sell various kinds of products, there has been proposed a service of analyzing shelf arrangement in a store on the basis of an image. This service requires a product identification model for analyzing, on the basis of an image indicating shelf arrangement, what kinds of products are included therein. Retail stores accept a lot of new products, products in new packages, and the like. The product identification model needs to identify a product regardless of whether a product in an image is an existing product already dealt by the store, a new product having never been dealt by the store, or a product having been dealt by the store but being in a new package, for example. The information processing apparatus 1A is an apparatus that causes such a product identification model M to carry out learning. For example, the image identification model M is a neural network model involving use of, e.g., a convolutional neural network.

Figure 4:
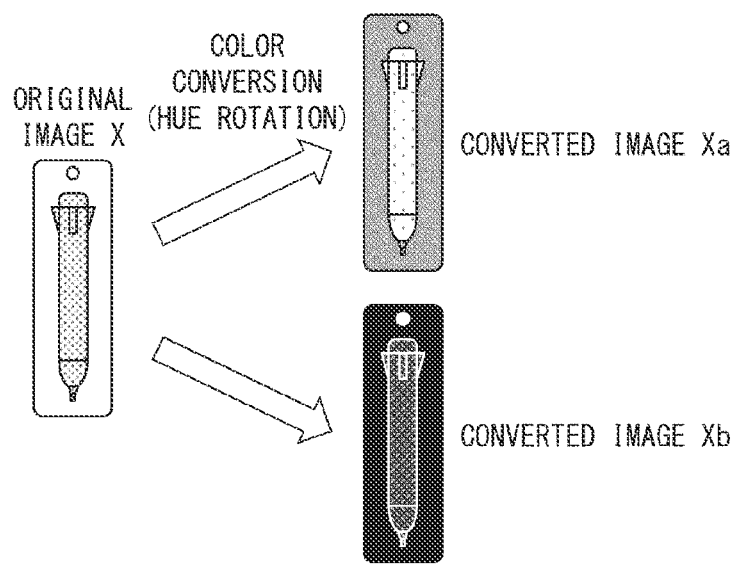
FIG. 4 shows an example of a process in which a training data generating section in accordance with the second example embodiment generates a converted image from an original image.

FIG. 4 shows an example of a process in which the training data generating section 12 of the information processing apparatus 1A in accordance with the second example embodiment generates a converted image from an original image. An original image X is an image arbitrarily selected by the training data generating section 12 from among a plurality of original images stored in the original image storage section 15. For example, the training data generating section 12 carries out color conversion on the original image X to generate converted images Xa and Xb. The color conversion method may be any method. The color conversion may be carried out by hue rotation involving use of a color circle in which the hue changes in an annular pattern. In the example shown in FIG. 4, the color conversion is carried out by hue rotation, and the converted images Xa and Xb are obtained by different hue rotation angles.

Figure 5:
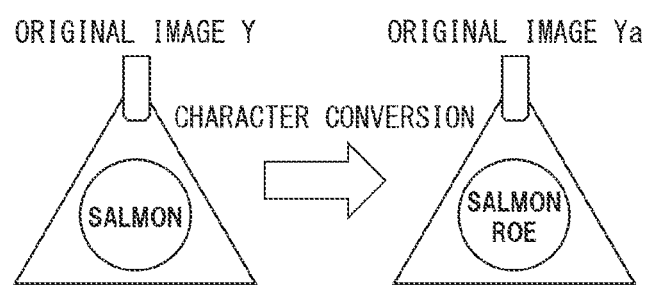
FIG. 5 shows another example of the process in which the training data generating section in accordance with the second example embodiment generates a converted image from an original image.

FIG. 5 shows another example of the process in which the training data generating section 12 generates a converted image from an original image. In the example shown in FIG. 5, the training data generating section 12 carries out conversion of a character string in an original image Y to generate a converted image Ya. For example, the training data generating section 12 generates the converted image Ya including a character string "salmon roe", which is a resultant of conversion of a character string "salmon" in the original image Y. Note that the character string after conversion may be a string of any Hiragana character(s), a string of any Katakana character(s), a string of any Kanji character(s), and/or a string of any alphabet(s) or any generally-used character string, provided that the character string is in consistent with a product in the image. Such a character string may be stored in any storage section.

By carrying out lateral inversion on an image of an original class which includes a character(s), etc. and which does not have lateral (reflection) symmetry, the original class can be turned into a different pseudo class. Meanwhile, in a case where the original class is an image having lateral (reflection) symmetry, such as an image of a dog or a cat, the original class cannot be turned into a different pseudo class even after lateral inversion.

The image conversion parameter storage section 11 stores therein a parameter indicating color conversion, a parameter indicating character conversion, a parameter indicating lateral inversion of an image, and/or the like as the image conversion parameters. The image conversion parameter storage section 11 may store a pseudo class which is to be given to a converted image obtained by conversion involving use of any of the image conversion parameters. The training data generating section 12 takes out any of the image conversion parameters stored in the image conversion parameter storage section 11, and converts the original image on the basis of the image conversion parameter so as to generate a converted image. The training data generating section 12 may give a pseudo class to the converted image thus generated. The training data generating section 12 stores, in the converted image storage section 16, the generated converted image and the pseudo class given thereto.

Figure 6:
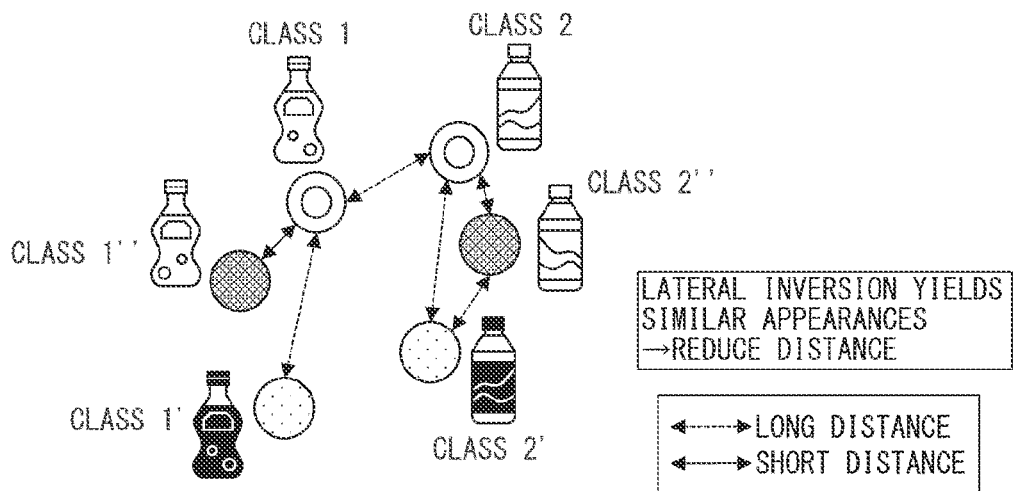
FIG. 6 is a conceptual image illustrating a degree of similarity between an original image and converted images or a difference in degree of similarity between the converted images.

FIG. 6 is a conceptual image illustrating degrees of similarity between an original image and converted images or a difference in degrees of similarity between the converted images. In an example, an index indicating the degree of similarity can be a distance in a multidimensional feature vector space which distance is output from a convolutional neural network that receives an image as input. In this case, a longer distance in the feature vector space is understood as indicating a lower similarity, and a shorter distance in the feature vector space is understood as indicating a higher similarity. In the conventional techniques, the convolutional neural network is caused to carry out learning according to an objective function intended to space away all classes from each other at equal distances. By additionally using the correction term, an objective function with which an original class and a pseudo class having similar appearances may be separated from each other at a relatively short distance in a feature vector space than other classes can be obtained.

In the following description, different original images will be represented by different class numbers. Specifically, m different original images will be represented as classes 1, 2, . . . m. Then, a converted image obtained by image conversion on the original image is represented with a superscript which varies depending on the image conversion method. Specifically, a converted image obtained by color conversion on an original image of class 1 is represented as class 1'. Further, a converted image obtained by lateral inversion on an original image of class m is represented as class m". That is, converted images obtained by n kinds of image conversion methods on an original image of class 1 are represented as class 1', class 1" . . . class $1^{(n)}$.

The image of class 1', which is obtained by color conversion on the image of class 1, has a lower similarity than that of the image of class 1", which is obtained by lateral inversion. When this relation can be expressed in terms of distance, a distance between the image of class 1 and the image of class 1' is longer than a distance between the image of class 1 and the image of class 1", as shown in FIG. 6. This applies also to a relation between an image of class 2 and images of classes 2' and 2", which are obtained by conversion on the image of class 2. In the conventional techniques, such a relation in terms of similarity is not considered at the stage of learning. Meanwhile, in the present example embodiment, the product identification model M is caused to carry out learning in consideration of the distance relation. Such a learning method which is carried out focusing on a distance in the feature vector space will be referred to as "metric learning". That is, the product identification model M is a model caused to carry out learning by the metric learning.

In the present example embodiment, a level of the similarity, i.e., a level of the distance is set by an intensity of a margin given to the likelihood of each class with respect to an input image. One example of the likelihood is an inner product (described later). In the following description, the intensity of the margin given to the likelihood of each class, more specifically, the intensity of the margin that adjusts a likelihood distribution of estimated classes of images output from the image identification model will be simply referred to as a "margin intensity". The margin intensity is one example of the correction term. The objective function used in learning is a loss function that is defined by distances between a feature of an image input to the convolutional neural network and features of all classes including pseudo classes, margins corresponding to (i) the input class, (ii) a pseudo class generated from the input class, and (iii) the other classes being added to their corresponding distances. That is, the loss-for-training determining section 13 sets intensities of the margins according to similarities between the classes, and generates, as an objective function, a loss function in which the intensities of the margins are reflected. With this, the product identification model using the neural network model can be caused to carry out learning with use of the loss function in which the margin intensities are considered as the correction terms.

Figure 7:
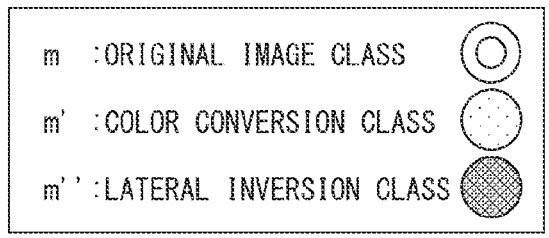
FIG. 7 is a table showing an example of setting of margin intensities for converted images.

FIG. 7 is a table showing an example of setting of margin intensities with respect to images to be learned. FIG. 7 shows (i) margin intensities to be added to pseudo classes generated from class 1 and (ii) margin intensities to be added to original classes other than class 1 and pseudo classes generated from the classes other than class 1, with respect to input of an original image of class 1. In the example shown in FIG. 7, an image conversion parameter 1 (hereinafter, referred to as "parameter 1") is a parameter for hue rotation. An image conversion parameter 2 (hereinafter, referred to as "parameter 2") is a parameter for a combination of hue rotation and lateral inversion. An image conversion parameter n (hereinafter, referred to as "parameter n") is a parameter for lateral inversion. Further, similarities of appearances between arbitrarily selected original class C and the other classes are assumed as follows: a similarity between class C and pseudo class C"<a similarity between class C and an original class other than class C and a similarity between class C and a pseudo class generated from a class other than class C a similarity between class C and pseudo class C'<a similarity between class C and pseudo class $C^{(n)}$.

In this case, margin intensities to be given to pseudo classes of class 1 are set as follows: parameter 2>parameter 1>parameter n. That is, the magnitudes of the margin intensities are adjusted so as to correspond to the appearance similarities. Specifically, pseudo class $1^{(n)}$, which is generated from class 1 of the original class with use of the image conversion parameter n, has a high similarity to the original class; therefore, a low margin intensity is given to pseudo class $1^{(n)}$. Consequently, a degree of increase in distance in learning is reduced. Meanwhile, class 1", which is generated from class 1 of the original image with use of the image conversion parameter 2, has a low similarity to the original class; therefore, a high margin intensity is given to class 1". As discussed above, the margin intensity functions to carry out adjustment so that, by learning, a feature distance between the original class and the pseudo class is brought into a relation corresponding to their appearances. Note that the original classes other than class 1 and the pseudo classes of these original classes have the same similarity with respect to the original class of class 1, and therefore are given the common margin intensity.

Figure 8:
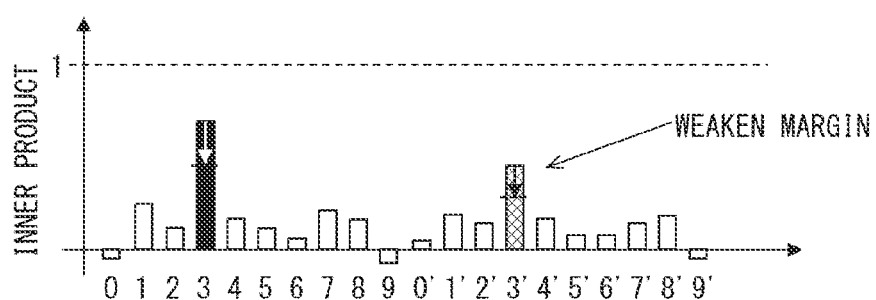
FIG. 8 is a table showing another example of setting of margin intensities for converted images.

FIG. 8 shows (i) margin intensities to be added to pseudo classes generated from class 2 and (ii) margin intensities to be added to original classes other than class 2 and pseudo classes generated from the classes other than class 2, with respect to input of an original image of class 2. Similarly to the case shown in FIG. 7, the margin intensities to be added to the pseudo classes of class 2 are adjusted so as to correspond to the appearance similarities. Further, the original classes other than class 2 and the pseudo classes of these original classes have the same similarity with respect to the original class of class 2, and therefore are given the common margin intensity.

The examples shown in FIGS. 7 and 8 respectively indicate the margin intensities with respect to original classes 1 and 2. Further, the same method can be used to determine a margin intensity to be used in learning with use of a converted image generated by the image conversion parameter. For example, a relation with respect the pseudo classes generated with use of the parameter n is as follows. That is, the pseudo classes generated with use of the parameter n are in a relation of lateral inversion with respect to the original classes, are in a relation of hue rotation with respect to parameter 2, and are in a relation of hue rotation and lateral inversion with respect to parameter 1. In this case, the margin intensities are in the following relation: parameter 1>parameter 2>original class. Thus, it is also possible to determine a correction term to be used in learning with use of a converted image generated by the conversion parameter n.

In the examples shown in FIGS. 7 and 8, the loss-for-training determining section 13 determines correction terms for converted images of original images of a plurality of classes, each of the correction terms being in common for one of the image conversion parameters used in conversion of a corresponding one of the original images. That is, in learning of the original images, the correction terms are determined for the converted images of the original images so that each of the correction terms is in common for a corresponding one of the image conversion parameters, and this applies to each class. Note that a correction term is determined so as to be in common for classes other than the class of the original image and the pseudo classes thereof, regardless of the image conversion parameter. Note also that the margin intensity may be determined by a user or may be determined mechanically by the information processing apparatus 1A. The information processing apparatus 1A may search for an effective margin intensity by, e.g., grid search, and may set the margin intensity. Alternatively, reinforcement learning may be carried out to set a more effective margin intensity.

Figure 9:
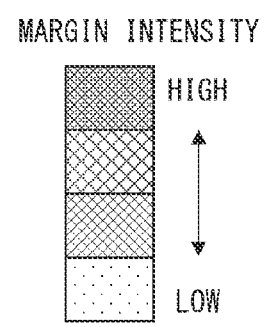
FIG. 9 is a conceptual view illustrating an idea of a loss-for-training determining section adjusting a distance in consideration of a margin intensity.

FIG. 9 is a conceptual view illustrating an idea of the loss-for-training determining section 13 determining a correction term in consideration of a margin intensity. The vertical axis of the graph shown in FIG. 9 indicates inner products of (i) feature vectors output from a model that receives original classes as input and (ii) representative feature vectors of the respective classes on an n-dimensional hypersphere having a radius of 1. The inner products indicate likelihoods of respective classes of the original images. An inner product having a value closer to 1 indicates a high likelihood that an input image belongs to that label. Meanwhile, an inner product having a value closer to −1 indicates that an input image has a lower similarity to the original image. The horizontal axis of the graph indicate labels 0 to 9 of original images and labels 0' to 9' of converted images obtained by lateral inversion on labels 0 to 9. In the example shown in FIG. 9, adjustment is carried out so as to permit a short distance between labels 3 and 3', in order that the product identification model M is caused to carry out learning when a product of label 3 is input. Specifically, as shown in FIG. 9, the margin of label 3' is weakened. The "weakening the margin" means setting a small margin intensity for label 3'. This makes it possible to weaken learning of the product identification model M with respect to the image of label 3'.

Figure 10:
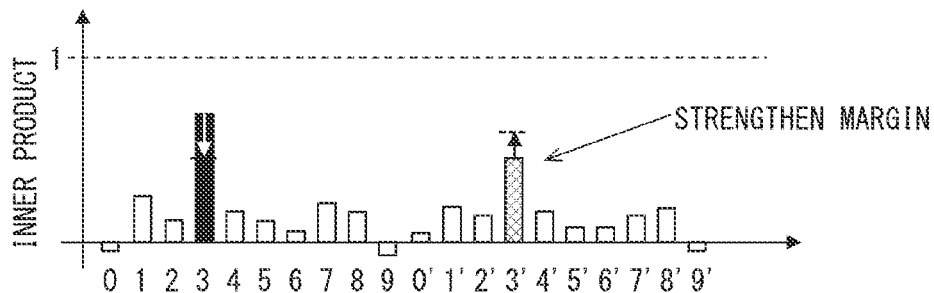
FIG. 10 is a conceptual view illustrating another idea of a loss-for-training determining section adjusting a distance in consideration of a margin intensity.

Alternatively, margin intensities may be set as shown in FIG. 10. In the example shown in FIG. 10, adjustment is carried out so as to strengthen the margin of label 3', i.e., to set a high margin intensity for label 3', in order that identification learning with respect to a product of label 3 is carried out. By such setting, it is possible to reinforce learning with respect to an image of label 3'. This makes it possible to reinforce the identification capacity of the product identification model M with respect to label 3'.

The learning section 14 causes the product identification model M to carry out learning so that the loss function given in consideration of the margin intensity as the correction term is made smaller. Specifically, the loss-for-training determining section 13 determines the margin intensity to be added to the loss function. The learning section 14 causes the product identification model M to identify a converted image, and changes a weight and a bias in the model so that a derived value of the loss function including a correction value in which the margin intensity is reflected becomes small. The learning section 14 repeatedly carries out such a process, and ends the learning at the point when the value of the loss function reaches a given range.

Figure 14:
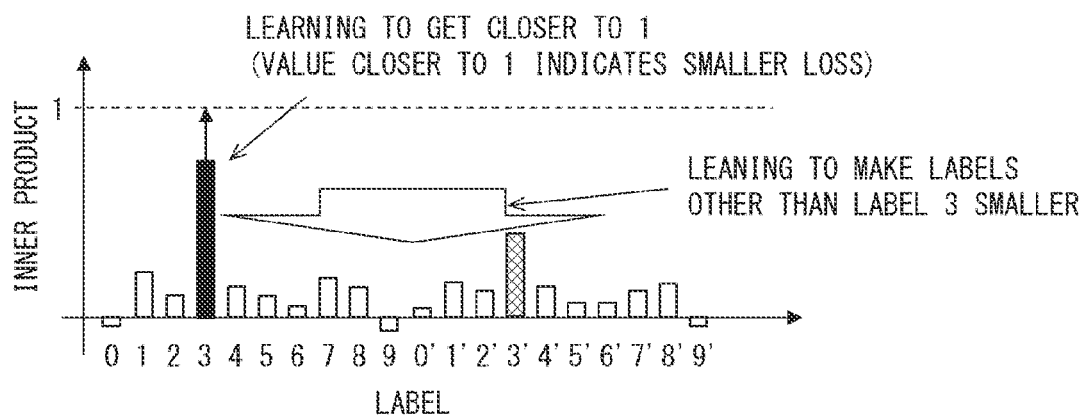
FIG. 14 is a conceptual view illustrating an idea of metric learning according to a conventional technique.

As discussed above, for the distance that serves as the loss function, the margin intensity is considered. The reason for this is as follows. As shown in FIG. 14, the conventional technique according to which a converted image of an original image is given a pseudo class different from its original class carries out learning such that the likelihood gets closer to 1 with respect to an image of label 3 and the likelihood gets closer to −1 with respect to all images of labels other than label 3. A margin to reduce the likelihood with respect to input of label 3 is effective to all of the other labels. That is, the likelihood for correctness is lowered by the margin, and thus it is necessary to increase the likelihood in learning. In order to increase the likelihood, a distance between feature vectors of inputs of the same class should be decreased and a distance between feature vectors of labels other than itself (label 3) should be increased. Meanwhile, considering that label 3' has a similar appearance, the likelihood of label 3' is decreased from an actual estimated value. This makes it possible to prevent a distance between the feature vectors of labels 3 and 3' from being forcibly increased by learning. Particularly, weakening the margin intensity makes it possible to prevent, in a case where there exists a class whose original class and pseudo class have similar appearances, learning from being carried out to forcibly increase the distance. Consequently, it is possible to avoid overlearning that may cause impairment of accuracy in testing.

The learning section 14 may change a frequency of use of a converted image generated with use of a given image conversion parameter and cause the product identification model M to carry out learning with use of the changed frequency. For example, in learning of the product identification model M, the learning section 14 may carry out adjustment of (i) increasing the number of images obtained by conversion of a certain label considered to involve a great learning effect or (ii) decreasing the number of images obtained by conversion of a certain label considered to involve a small learning effect, for example. Consequently, it is possible to carry out learning by selecting a large number of products of a certain class(es) or a large number of products of a class(es) involving a great learning effect.

At the stage of learning, n-fold cross validation may be employed, for example. According to the n-fold cross validation, training data is divided into data-for-training, data-for-validation, and data-for-evaluation. The learning section 14 causes the product identification model M to carry out learning with use of the data-for-training. Further, a user carries out validation with use of the data-for-validation, and carries out evaluation with use of the data-for-evaluation. Note that the standard on how to set the above-described margin intensity can be set on the basis of user's judgment on the degree of similarity. Alternatively, however, the magnitude relation between the margin intensities may be set by another method.

Note that the obtaining section 10, the image conversion parameter storage section 11, the training data generating section 12, the loss-for-training determining section 13, the learning section 14, the original image storage section 15, and the converted image storage section 16, which constitute the information processing apparatus 1A, and the product identification model M may at least partially be arranged dispersedly so as to be communicable to each other. Alternatively, the above-described sections may at least partially be arranged in the cloud so as to be communicable to each other.

Figure 11A:
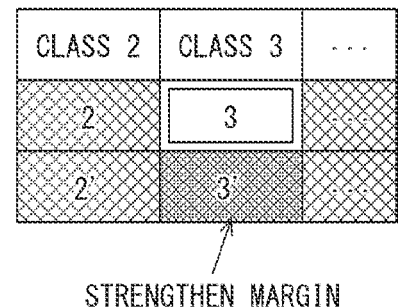
FIG. 11A is a table showing an example in which the loss-for-training determining section determines margin intensities of one pattern for converted images given by respective parameters.
Figure 11B:
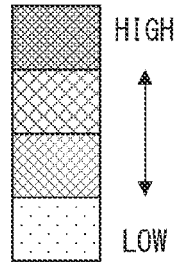
FIG. 11B is a table showing an example in which the loss-for-training determining section determines margin intensities of another pattern for converted images given by respective parameters.

The above-discussed example embodiment has dealt with the examples in which, as shown in FIGS. 7 and 8, the loss-for-training determining section 13 determines margin intensities for the converted images of classes 1, 2, . . . , m, which are the plurality of original images, such that each margin intensity is in common for one of the image conversion parameters used in conversion of a corresponding one of the original images. Alternatively, however, the loss-for-training determining section 13 may determine correction terms for converted images of original images of a plurality of plural classes, each of the correction terms depending on (i) one of the image conversion parameters used in conversion of a corresponding one of the original images and (ii) a corresponding one of the classes. FIGS. 11A and 11B are tables showing an example in which the loss-for-training determining section 13 determines margin intensities of different patterns for the converted images given by the respective parameters. A distribution of margin intensities, shown in FIG. 11A, of pseudo classes of original class 1 with respect to original class 1 differs from a distribution of margin intensities, shown in FIG. 11B, of pseudo classes of original class 2 with respect to original class 2. Parameters 1, 2, . . . , n are as discussed in FIG. 7. As shown FIGS. 11A and 11B, the margin intensities (correction terms) for images generated with use of parameters 1, 2, . . . , n depend on the image conversion parameters and classes. In this manner, the product identification model M may be caused to carry out learning while changing the distribution pattern of the margin intensities. With this, prevention of overlearning of the product identification model M is expected. Thus, it is possible to generate, from limited training data, a larger number of training images effective for learning and to user the training images. That is, it is possible to cause the product identification model M to carry out learning so that the product identification model M can achieve feature expressions with which a new product can be identified.

The method for setting the margin intensity (correction term) to the image conversion parameter may be set by a user or by the loss-for-training determining section 13 with use of a correction term generating model. The correction term generating model may carry out, with respect to a new label, conversion of randomly exchanging margin intensities from one to another or multiplexing an existing margin intensity by a coefficient, for example. The correction term generating model may be caused to carry out learning so as to refer to a result of learning carried out in consideration of a generated correction term and to generate a correction term suitable for learning. This makes it possible to cause the product identification model to carry out learning with a wide variety of correction terms.

(Effects of Information Processing Apparatus 1A)

The information processing apparatus 1A in accordance with the present example embodiment is configured to include, in addition to the configuration of the information processing apparatus 1 in accordance with the first example embodiment, the obtaining section 10, the image conversion parameter storage section 11, the original image storage section 15, and the converted image storage section 16, the information processing apparatus 1A causing the product identification model M to carry out learning. Therefore, with the information processing apparatus 1A in accordance with the present example embodiment, it is possible to attain, in addition to the effects of the information processing apparatus 1 in accordance with the first example embodiment, an effect of making it possible to cause the product identification model M to carry out learning in consideration of a similarity between an original class of a product image and a pseudo class thereof.

Third Example Embodiment

The following description will discuss a third example embodiment of the present invention in detail with reference to the drawings. Note that members having identical functions to those of the first and second example embodiments are given identical reference signs, and a description thereof will be omitted.

Figure 12:
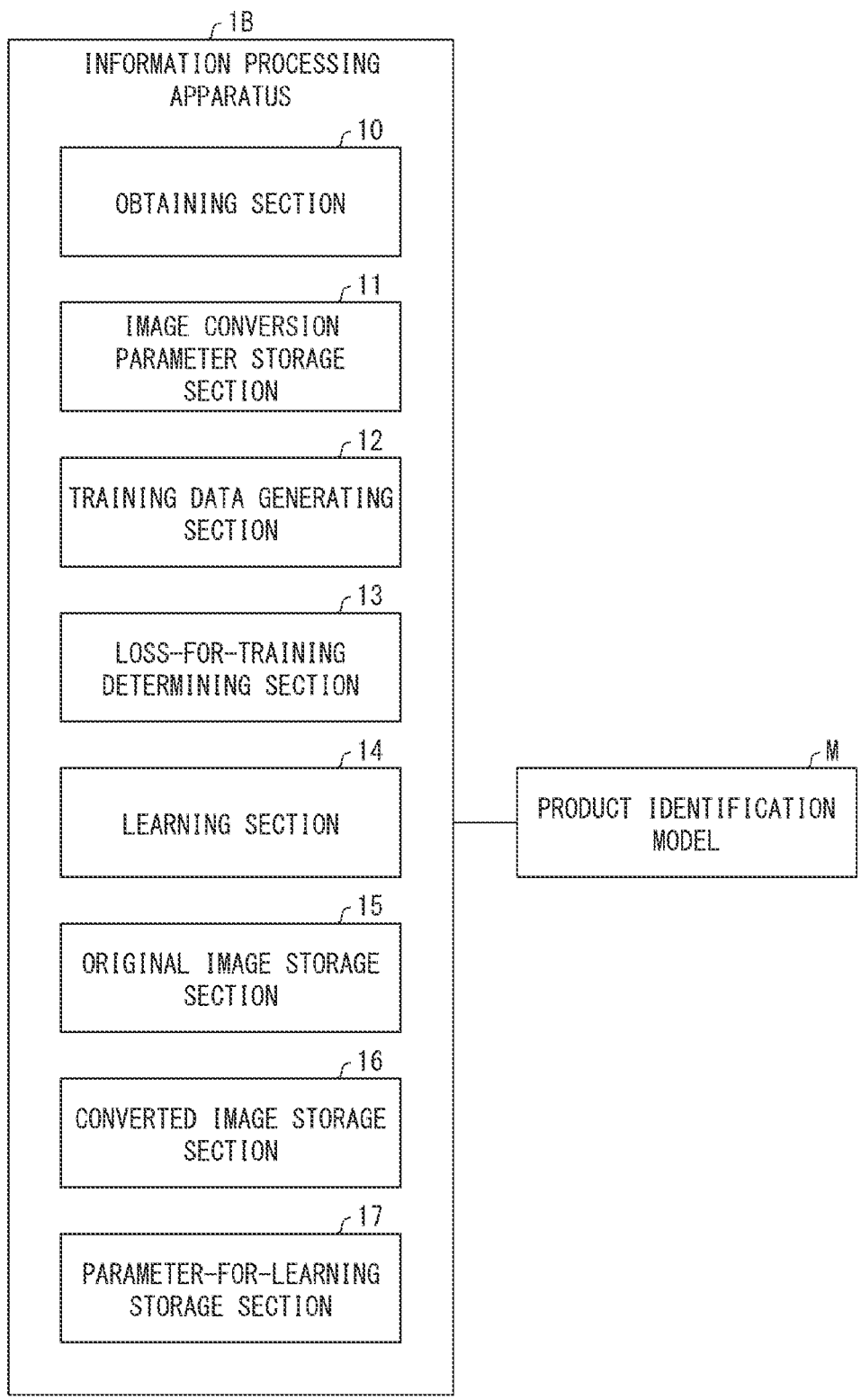
FIG. 12 is a block diagram illustrating a configuration of an information processing apparatus 1B in accordance with a third example embodiment of the present invention.
Figure 13:
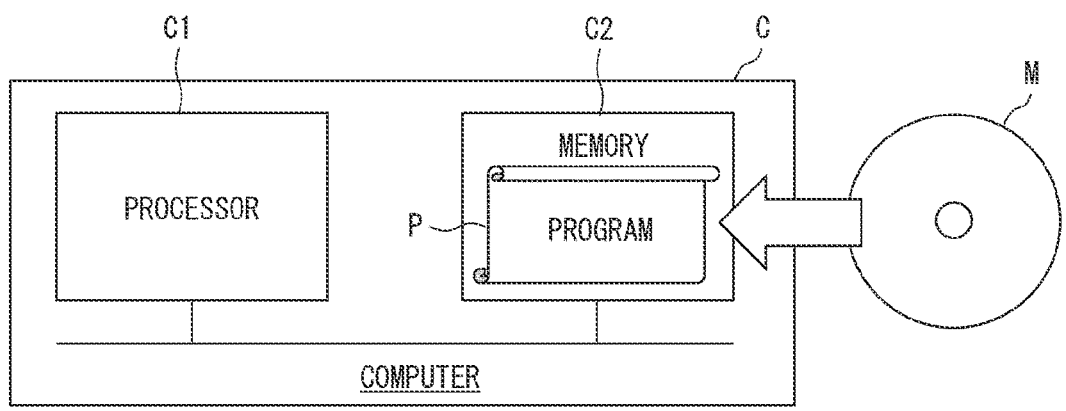
FIG. 13 is a view illustrating a configuration for realizing an information processing apparatus by software.

FIG. 12 is a block diagram illustrating a configuration of an information processing apparatus 1B in accordance with a third example embodiment of the present invention. The information processing apparatus 1B includes an obtaining section 10, an image conversion parameter storage section 11, a training data generating section 12, a loss-for-training determining section 13, a learning section 14, an original image storage section 15, a converted image storage section 16, and a parameter-for-learning storage section 17. The information processing apparatus 1B is connected with a product identification model M such that the information processing apparatus 1B is communicable with the product identification model M.

The functions of the obtaining section 10, the image conversion parameter storage section 11, the training data generating section 12, the loss-for-training determining section 13, the learning section 14, the original image storage section 15, and the converted image storage section 16 are identical to the functions of the corresponding sections described in the second example embodiment.

The parameter-for-learning storage section 17 stores therein correction terms determined for respective image conversion parameters. Each of the correction terms determined for the respective image conversion parameters may also be referred to as a parameter-for-learning. In an example, the parameter-for-learning may be a set of patterns of margin intensities such as those shown in FIG. 7, FIG. 8, or FIGS. 11A and 11B or a set of inner products given in consideration of margin intensities such as those shown in FIG. 9 or 10. A parameter-for-learning confirmed as being effective to learning of a certain product identification model is considered to be effective also to other product identification models. Further, the parameter-for-learning may be used as a template for generating different parameters-for-learning. Such parameters-for-learning for different patterns may be stored. Then, the loss-for-training determining section 13 may select an appropriate one of the parameters-for-learning stored and may use the selected parameter-for-learning to cause a new product identification model to carry out learning. This makes it possible to effectively train the product identification model.

(Effects of Information Processing Apparatus 1B)

As discussed above, the information processing apparatus 1B in accordance with the present example embodiment is configured to include, in addition to the configuration of the information processing apparatus 1A in accordance with the second example embodiment, the parameter-for-learning storage section 17. Therefore, with the information processing apparatus 1B in accordance with the present example embodiment, it is possible to attain, in addition to the effects given by the information processing apparatus 1A in accordance with the second example embodiment, an effect of making it possible to cause the product identification model M to carry out learning more effectively.

[Software Implementation Example]

Part of or the whole of functions of the information processing apparatuses 1, 1A, and 1B can be realized by hardware such as an integrated circuit (IC chip) or can be alternatively realized by software.

In the latter case, each of the information processing apparatuses 1, 1A, and 1B is realized by, for example, a computer that executes instructions of a program that is software realizing the foregoing functions. FIG. 12 shows an example of such a computer (hereinafter, referred to as a "computer C"). The computer C includes at least one processor C1 and at least one memory C2. The memory C2 has a program P stored therein, the program P causing the computer C to operate as the information processing apparatuses 1, 1A, and 1B. In the computer C, the processor C1 reads and executes the program P from the memory C2, thereby realizing the functions of the information processing apparatuses 1, 1A, and 1B.

The processor C1 may be, for example, a central processing unit (CPU), a graphic processing unit (GPU), a digital signal processor (DSP), a micro processing unit (MPU), a floating point number processing unit (FPU), a physics processing unit (PPU), a microcontroller, or a combination of any of them. The memory C2 may be, for example, a flash memory, hard disk drive (HDD), solid state drive (SSD), or a combination of any of them.

The computer C may further include a random access memory (RAM) in which the program P is loaded when executed and various data is temporarily stored. In addition, the computer C may further include a communication interface via which the computer C transmits/receives data to/from another device. The computer C may further include an input-output interface via which the computer C is connected to an input-output device such as a keyboard, a mouse, a display, and/or a printer.

The program P can be stored in a non-transitory, tangible storage medium M capable of being read by the computer C. Examples of the storage medium M encompass a tape, a disk, a card, a memory, a semiconductor memory, and a programmable logic circuit. The computer C can obtain the program P via the storage medium M. Alternatively, the program P can be transmitted via a transmission medium. Examples of such a transmission medium encompass a communication network and a broadcast wave. The computer C can also obtain the program P via the transmission medium.

Supplementary Note 1

The present invention is not limited to the example embodiments, but can be altered by a skilled person in the art within the scope of the claims. The present invention also encompasses, in its technical scope, any embodiment derived by combining technical means disclosed in differing embodiments.

Supplementary Note 2

Some or all of the above embodiments can be described as below. Note, however, that the present invention is not limited to aspects described below.

Supplementary Remarks 1

An information processing apparatus including: a training data generating means that generates converted images from original images with use of image conversion parameters and giving, to the converted images thus generated, pseudo classes corresponding to classes of the original images and the image conversion parameters, respectively; a loss-for-training determining means that generates an objective function in which correction terms each given in consideration of a degree of similarity between a corresponding one of the classes and a corresponding one of the pseudo classes is reflected, the correction terms determined for the respective image conversion parameters; and a learning means that causes an image identification model to carry out learning with use of the converted images and the objective function.

Supplementary Remarks 2

The information processing apparatus described in Supplementary Remarks 1, wherein: the image identification model is a model which is caused to carry out learning by metric learning, and the objective function is a loss function in which intensities of margins are reflected as the correction terms, the margins adjusting a likelihood distribution of estimated classes of images output from the image identification model.

Supplementary Remarks 3

The information processing apparatus described in Supplementary Remarks 1 or 2, wherein: the loss-for-training determining means determines the correction terms for the converted images of the original images of the classes, each of the correction terms being in common for one of the image conversion parameters used in conversion of a corresponding one of the original images.

Supplementary Remarks 4

The information processing apparatus described in Supplementary Remarks 1 or 2, wherein: the loss-for-training determining means determines the correction terms for the converted images of the original images of the classes, each of the converted images depending on (i) one of the image conversion parameters used in conversion of a corresponding one of the original images and (ii) a corresponding one of the classes.

Supplementary Remarks 5

The information processing apparatus described in any one of Supplementary Remarks 1 to 4, wherein: the loss-for-training determining means determines the correction terms for the image conversion parameters with use of a correction term generating model.

Supplementary Remarks 6

The information processing apparatus described in any one of Supplementary Remarks 1 to 5, further including a parameter-for-learning storing means that stores the correction terms determined for the respective image conversion parameters.

Supplementary Remarks 7

The information processing apparatus described in any one of Supplementary Remarks 1 to 6, wherein: the learning means changes a frequency of use of, among the converted images, a converted image generated with use of a given one of the image conversion parameters, and causes the image identification model to carry out learning with use of the changed frequency.

Supplementary Remarks 8

An information processing method including: at least one processor generating converted images from original images with use of image conversion parameters and giving, to the converted images thus generated, pseudo classes corresponding to classes of the original images and the image conversion parameters, respectively; the at least one processor generating an objective function in which correction terms each given in consideration of a degree of similarity between a corresponding one of the classes and a corresponding one of the pseudo classes is reflected, the correction terms being determined for the respective image conversion parameters; and the at least one processor causing an image identification model to carry out learning with use of the converted images and the objective function.

Supplementary Remarks 9

An information processing program causing a computer to execute: a process of generating converted images from original images with use of image conversion parameters and giving, to the converted images thus generated, pseudo classes corresponding to classes of the original images and the image conversion parameters, respectively; a process of generating an objective function in which correction terms each given in consideration of a degree of similarity between a corresponding one of the classes and a corresponding one of the pseudo classes is reflected, the correction terms being determined for the respective image conversion parameters; and a process of causing an image identification model to carry out learning with use of the converted images and the objective function.

Supplementary Remarks 10

A non-transitory storage medium in which an information processing program described in Supplementary Remarks 9 is stored.

Supplementary Remarks 11

An information processing apparatus comprising at least one processor configured to execute: a first generating process of generating converted images from original images with use of image conversion parameters and giving, to the converted images thus generated, pseudo classes corresponding to classes of the original images and the image conversion parameters, respectively; a second generating process of generating an objective function in which correction terms each given in consideration of a degree of similarity between a corresponding one of the classes and a corresponding one of the pseudo classes is reflected, the correction terms being determined for the respective image conversion parameters; and a learning process of causing an image identification model to carry out learning with use of the converted images and the objective function.

Note that this information processing apparatus may further include a memory. In this memory, a program causing the processor to execute the first generating process, the second generating process, and the learning process may be stored. Further, this program may can be stored in a non-transitory, tangible storage medium capable of being read by a computer.

REFERENCE SIGNS LIST 1, 1A, 1B: information processing apparatus
10: obtaining section
11: image conversion parameter storage section
12: training data generating section
13: loss-for-training determining section
14: learning section
15: original image storage section
16: converted image storage section
17: parameter-for-learning storage section

The invention claimed is:

1. An information processing apparatus comprising at least one processor configured to execute:
a training data generating process of generating converted images from original images with use of image conversion parameters and giving, to the converted images thus generated, pseudo classes that are different from classes of the original images and that correspond to the classes of the original images and the image conversion parameters, respectively;
a loss-for-training determining process of generating an objective function in which correction terms each given in consideration of a degree of similarity between a corresponding one of the classes and a corresponding one of the pseudo classes is reflected, the correction terms being determined for the respective image conversion parameters, wherein each pseudo class of the pseudo classes has a corresponding intensity of margin, such that pseudo classes having a higher degree of similarity have a lower intensity of margin than pseudo classes having a lower degree of similarity; and
a learning process of causing an image identification model to carry out learning with use of the converted images and the objective function.

2. The information processing apparatus according to claim 1, wherein:
the image identification model is a model which is caused to carry out learning by metric learning, and the objective function is a loss function in which intensities of margins are reflected as the correction terms, the margins adjusting a likelihood distribution of estimated classes of images output from the image identification model.

3. The information processing apparatus according to claim 1, wherein:
the loss-for-training determining process generates the objective function by determining the correction terms for the converted images of the original images of the classes, each of the correction terms being in common for one of the image conversion parameters used in conversion of a corresponding one of the original images.

4. The information processing apparatus according to claim 1, wherein:
the loss-for-training determining process generates the objective function by determining the correction terms for the converted images of the original images of the classes, each of the correction terms depending on (i) one of the image conversion parameters used in conversion of a corresponding one of the original images and (ii) a corresponding one of the classes.

5. The information processing apparatus according to claim 1, wherein:
the loss-for-training determining process determines the correction terms for the image conversion parameters with use of a correction term generating model.

6. The information processing apparatus according to claim 1, wherein:
the at least one processor is further configured to execute a parameter-for-learning storing process of storing the correction terms determined for the respective image conversion parameters.

7. The information processing apparatus according to claim 1, wherein:
the learning process changes a frequency of use of, among the converted images, a converted image generated with use of a given one of the image conversion parameters, and causes the image identification model to carry out learning with use of the changed frequency.

8. An information processing method comprising:
at least one processor generating converted images from original images with use of image conversion parameters and giving, to the converted images thus generated, pseudo classes that are different from classes of the original images and that correspond to the classes of the original images and the image conversion parameters, respectively;
the at least one processor generating an objective function in which correction terms each given in consideration of a degree of similarity between a corresponding one of the classes and a corresponding one of the pseudo classes is reflected, the correction terms being determined for the respective image conversion parameters, wherein each pseudo class of the pseudo classes has a corresponding intensity of margin, such that pseudo classes having a higher degree of similarity have a lower intensity of margin than pseudo classes having a lower degree of similarity; and
the at least one processor causing an image identification model to carry out learning with use of the converted images and the objective function.

9. A non-transitory, computer-readable storage medium in which an information processing program is stored, the information processing program causing a computer to execute:
a process of generating converted images from original images with use of image conversion parameters and giving, to the converted images thus generated, pseudo classes that are different from classes of the original images and that correspond to the classes of the original images and the image conversion parameters, respectively;
a process of generating an objective function in which correction terms each given in consideration of a degree of similarity between a corresponding one of the classes and a corresponding one of the pseudo classes is reflected, the correction terms being determined for the respective image conversion parameters, wherein each pseudo class of the pseudo classes has a corresponding intensity of margin, such that pseudo classes having a higher degree of similarity have a lower intensity of margin than pseudo classes having a lower degree of similarity; and
a process of causing an image identification model to carry out learning with use of the converted images and the objective function.

* * * * *